Aug. 17, 1926.
C. F. KOCH, JR
1,596,665
RIM AND TIRE LOCK
Filed March 13, 1925
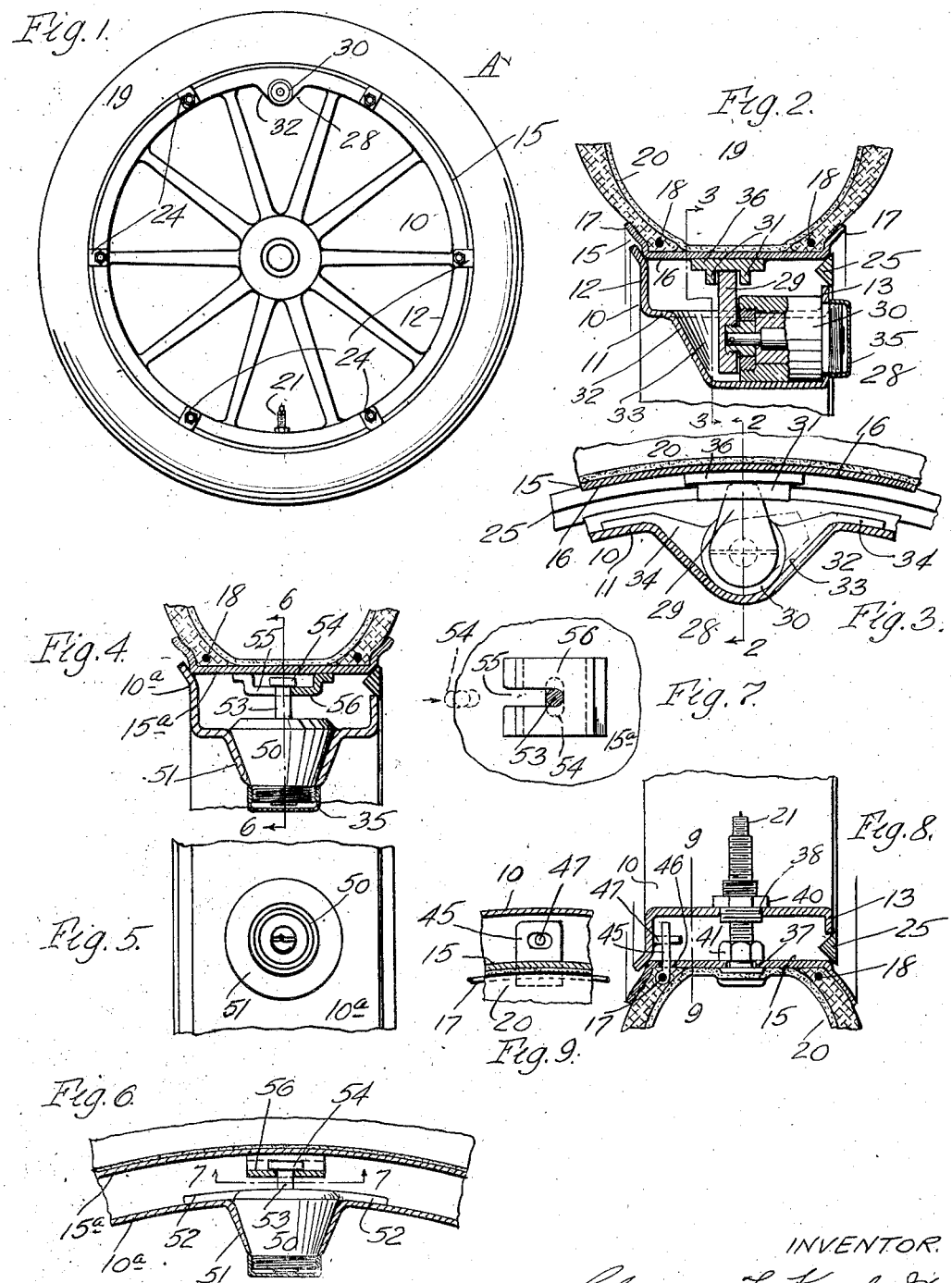
INVENTOR.
Charles F. Koch Jr.
By Parker & Brockerow
ATTORNEYS Patented Aug. 17, 1926.

1,596,665

UNITED STATES PATENT OFFICE.

CHARLES F. KOCH, JR., OF BUFFALO, NEW YORK.

RIM AND TIRE LOCK.

Application filed March 13, 1925. Serial No. 15,397.

This invention relates to improvements in locking means or devices for preventing theft or unauthorized removal of demountable rims and tires used on vehicle wheels.

Wheel rims of this type have been proposed in which specially devised attaching members or interfitting parts on the rims and fellies were provided with locking devices or locks intended to secure the rims on the wheels and prevent their removal except by means of keys or similar implements. These constructions, however, are not adapted for use with standard wheels and rims, wherein the rims are secured by detachable clips or similar devices. Moreover these special constructions are expensive to produce, and replacement of parts means loss of time, as such parts are not generally stocked.

One of the objects of the present invention is to provide an improved, simplified and secure locking means or device adapted for use with rims and wheels or wheel fellies of standard construction with only a slight modification or change in the standard equipment.

Other objects are to construct a locking device of this character in which a lock-operated bolt or member is used to prevent theft of the rim and which is entirely independent of the rim securing means; also to provide means to be used in connection with the usual tire valve tube, so that the valve tube will be adapted to cooperate with the locking device to positively prevent the unauthorized removal of a rim or tire from a wheel; also to provide improved and simplified means for preventing the tire from being forcibly removed from a rim which is locked to a wheel with the locking means of this invention, and also to provide improved locking means or devices for demountable rims and tires in other respects hereinafter specified and claimed.

In the accompanying drawings;

Fig. 1 is a face view of a vehicle wheel having a demountable rim and tire thereon, said wheel and rim being equipped with locking means embodying this invention.

Fig. 2 is a transverse section, on an enlarged scale, of the locking means on line 2—2, Fig. 3.

Fig. 3 is a longitudinal section thereof on line 3—3, Fig. 2.

Fig. 4 is a transverse section showing a locking device of modified construction.

Fig. 5 is a fragmentary inside face view of a portion of a felly with the locking device of Fig. 4 thereon.

Fig. 6 is a longitudinal section thereof on line 6—6, Fig. 4.

Fig. 7 is a fragmentary sectional view thereof on line 7—7, Fig. 6.

Fig. 8 is a transverse section of a rim and wheel felly showing a tire valve tube provided with means whereby the unauthorized disengagement of the tube from the rim and felly is prevented.

Fig. 9 is a fragmentary longitudinal section, on line 9—9, Fig. 8, showing the means for preventing the unauthorized removal of the tire from the locked rim.

In Fig. 1 of the drawings a vehicle wheel and demountable rim of substantially standard construction is shown, said wheel and rim being provided with means embodying the invention for preventing the theft of, or unauthorized removal of the rim or tire.

This wheel A (or its equivalent, such as a spare rim holder or carrier) is provided with a felly or annular member 10 of the usual channel section comprising a web 11 and opposite outwardly directed flanges 12 and 13.

Any standard rim, removably secured to the felly 10 by any usual or suitable securing devices may be used, such for instance as the rim 15 which is of shallow channel formation, having a bottom web 16 and outwardly flaring flanges 17 for retaining the beaded portions 18 of any standard type of pneumatic tire 19 thereon, said tire having an inner tube 20 which is inflated with air introduced through the usual standard tire valve tube 21, Figs. 1 and 8. The rim 15 is adapted to be positioned on the felly 10, or removed therefrom by a sidewise movement, for instance to the right in Fig. 2, and when positioned on the wheel, is held in place by means of the standard detachable clips 24, Fig. 1, or by a removable locking ring 25 arranged at one side of the wheel so as to overlap adjacent edges of the felly and rim. This ring is held in place by clips (not shown) similar to the clips 24. As thus far described, the parts are of known construction and of themselves form no part of this invention, and other standard rims and attaching devices could be substituted for those shown.

In accordance with the invention, the wheel felly 10 and rim 15 are provided with a single relatively small and simple locking or lock-operated device for preventing the theft of the rim and tire, which is adapted to so function even though the usual clips or devices 24 or rings 25 are removed. In the form shown in Figs. 1-3, this locking device 28 comprises a movable finger or bolt 29 rigidly secured to the spindle of a small cylinder or other suitable lock 30 secured on the felly and which is adapted to be swung, by operating the lock, into and out of locking position between a pair of inwardly projecting spaced lugs or narrow flanges 31 on the rim. The flanges 31 extend in the plane of the wheel, or are substantially parallel to the side flanges of the rim, and the lock 30 is arranged transversely of the wheel so that the bolt 29 can swing in a plane parallel to the lugs or flanges 31.

The lock 30 may be mounted or secured on the wheel in any suitable manner. As shown, the web 11 of the felly 10 is depressed or deformed at 32 to form a pocket 33 in the bottom of which the lock is secured. The lock is preferably provided with opposite lateral arms or wings 34 adapted to engage the sides of the pocket 33 and overlap upon the adjacent portions of the web 11 to which they are rigidly secured, as by welding or otherwise. The outer end of the lock extends outwardly through an aperture in the pocket 33 to permit the insertion of a key, the key hole being protected against the entrance of dirt or water by a threaded dust cap 35. The lock is preferably of the kind in which the removal of the key is prevented, except when in locked position, so that the user can be certain that the bolt 29 is in locking position when removing the key.

The retaining flanges 31 can be formed on or secured to the rim 15 in any suitable way such as by forming them on a separate plate or part 36 and welding or riveting this part to the inner face of the rim. Additional locking devices 28 could be used if desired.

While the locking device 28 can be relied upon to prevent the theft of the tire and rim in most cases, additional means, cooperating with, or supplementary to, the locking means are provided. For this purpose the locking device 28 is preferably disposed substantially opposite to the tire valve tube 21 as shown in Fig. 1. This valve tube as usual, extends from the inner tube 20 through holes 37 and 38 in the rim 15 and web 11 of the felly respectively, being detachably held in place on the latter by the usual lock nut 40. It might sometimes happen that unauthorized attempts would be made to demount the tire and rim by removing the locking ring, clips or other securing devices, and deflate the inner tube so as to disengage the tire valve tube 21 from the felly and rim by pushing the valve tube through the holes 37 and 38 and against the deflated inner tube. The rim and tire might then be forced off the wheel at this side of the wheel, and then by swinging the tire and rim outwardly still further, a leverage would be thus acquired sufficient to snap off the bolt 29 or break the connection between the bolt 29 and the lock 30. To prevent this the valve tube 21 is provided with a second locking nut 41 which is screwed down on the valve tube into engagement with the rim before the rim is placed on the felly or wheel, thus locking the valve against endwise movement relatively to the rim and preventing the valve from being forced out of the holes 37 and 38 in the rim and felly. It will therefore be seen that even should the usual securing clips, rings or other devices be removed and the tire deflated, the locking device 28 and the opposed valve 21 secured in the manner stated, positively prevents the rim and tire from being stolen.

The lock 30 is small and only a relatively slight depression or pocket is required to be formed in the felly to receive it. The lugs 31 of the part 36 extend only a slight distance into the felly and when the securing ring 25 is removed and the bolt disengaged from said lugs, the lugs will pass freely over the felly at that side as the rim is removed.

As a further aid in the prevention of theft of the tire, the wheel and tire may be provided with interlocking parts which are adapted to frustrate unauthorized attempts at removal of the tire from the rim by deflating the tire and then forcing the same over a tire retaining flange of the rim. Means of this sort, particularly adapted for use with clincher tires and rims, are shown in Figs. 8 and 9, and comprise a fixed loop or apertured lug 45 preferably formed on or secured to a tire bead in a position such that it extends radially of the wheel so as to pass through a hole 46 in the rim 15 and into the channel of the felly adjacent the flange 12 thereof. A pin or fixed stud 47 on the face of the flange 12 is adapted to extend into the aperture in the lug 45. These interengaging parts effectively prevent the tire from being pried off as the tire bead cannot move outwardly and is prevented from being forced towards the valve by the engagement of the lug with the side of the hole in the rim.

The rim and tire, however, can be easily removed laterally from the wheel or positioned thereon when the locking device 28 is unlocked. Any other suitable interengaging parts may be provided to prevent the tires from being pried loose.

The invention is not limited to the particular arrangement of the locking device 28 shown in Figs. 1-3 as other constructions adapted to serve a similar purpose may be employed. For instance, in Figs. 4-7, a locking device is shown having a lock 50 arranged radially of the wheel in a depressed, conical pocket 51 in the web of the felly 10ª, the housing of the lock having a pair of arms or lugs 52 for securing the lock to the felly. The bolt 53 of the lock 50 extends into the space between the felly and rim and is provided with an elongate head 54. This head is adapted, in its unlocked position, to extend with its longest sides disposed transversely of the wheel, and in this position to pass freely into and out of an elongate transverse slot or aperture 55 in a fixed box-like pocket 56 formed on or secured to the inner face of the rim 15ª. When the rim 15ª with the tire thereon is to be mounted on the wheel, the slot 55 is alined with the bolt 53 and the rim is moved laterally on to the wheel so that the bolt 53 and its head 54 will pass into the slot, as shown in Figs. 4 and 7. By turning the key in the lock, the bolt 53 is rotated and the head 54 will extend transversely across the slot and will be prevented from removal therefrom either laterally or radially, by the engagement of the head with the portions of the pocket adjacent the slot 55.

The locking devices 28 or 50, the lock nut 41 and the interfitting tire loop or lug 45 and stud 47 described are all relatively small parts which can be added to or formed on standard wheels, rims and tires at slight extra expense and these parts provide very effective and secure means for preventing the theft of tires and rims. Moreover these parts are not depended upon to hold or secure the rim on the wheel or felly, the usual strong clips or rings and clips being employed for this purpose in the usual manner.

I claim as my invention:

1. In a wheel having a demountable rim and securing devices for holding said rim in operative relation on the wheel, the combination of a lock operated member on said wheel independent of said securing devices and adapted to engage a part on the rim to prevent the unauthorized removal of the rim from said wheel when said securing devices have been detached.

2. In a wheel having a demountable rim, a tire on said rim, securing devices for holding said rim in operative relation on said wheel, and a valve tube for permitting the tire to be inflated and which extends from said tire through holes in said rim and said wheel, the combination of a lock operated member arranged on said wheel at a point remote from said valve tube, said lock operated member being adapted to engage a part on said rim to prevent the unauthorized removal of the rim from said wheel when said securing devices have been detached, and holding means on said valve tube adapted to engage said rim to prevent movement of said tube relatively to said rim and wheel when the tire is deflated, whereby said valve tube and said tube holding means are adapted to cooperate with said lock operating member in preventing unauthorized removal of said rim and tire.

3. In a wheel having a demountable rim, a tire on said rim, securing devices for holding said rim in operative relation on said wheel, and a valve tube for permitting the tire to be inflated and which extends from said tire through holes in said rim and said wheel, the combination of a lock operated member arranged on said wheel and adapted to engage with a part on said rim, a holding nut on said valve tube engaging said rim to prevent movement of said tube relatively to said rim and wheel when said tire is deflated, said lock operated member and said valve tube and tube holding nut being arranged on opposite sides of said wheel to prevent the unauthorized removal of said rim and tire when said securing devices are detached.

4. In a wheel having a demountable rim and securing devices for holding said rim in operative relation on the wheel, the combination of a lock functioning independently of said securing devices and arranged in a pocket in said wheel and a finger adapted to be moved by said lock so as to engage between a pair of transversely arranged fixed parts on said rim to prevent unauthorized lateral movements or removal of said rim when said securing devices are detached.

5. In a wheel having a demountable rim and securing devices for holding said rim in operative relation on the wheel, the combination of a lock functioning independently of said securing devices and arranged in a pocket in the peripheral portion of said wheel, parts on the lock housing adapted to extend laterally out of said pocket so as to engage and be secured to the wheel to maintain said lock in position, said lock having a movable part, and said rim having projecting fixed parts disposed so as to engage and straddle said movable lock part to prevent lateral movement of said rim relatively to said wheel when said movable lock part is in locked position and said securing devices are detached.

CHARLES F. KOCH, Jr.